Figure 1:
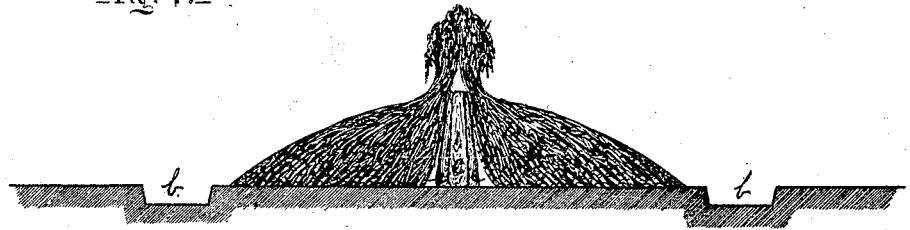

(155.)

F. O. DARBY.
Improvement in Preserving Sugar Cane.

No. 122,936.          Patented Jan. 23, 1872.

Witnesses.
L. A. Olmstead
H. N. Jenkins

Inventor.
Francois O. Darby
per Jenkins & Olmstead
Attorneys

UNITED STATES PATENT OFFICE.

FRANÇOIS O. DARBY, OF ATTAKAPAS, LOUISIANA.

IMPROVEMENT IN PRESERVING SUGAR-CANE.

Specification forming part of Letters Patent No. 122,936, dated January 23, 1872.

I, FRANÇOIS O. DARBY, town of Attakapas, parish of St. Landry and State of Louisiana, have invented a new, useful, and Improved Method of Preserving "Planting-Cane," or what is technically known throughout the sugar-producing sections of Louisiana as "plant-cane;" and I hereby declare the following to be a full, clear, and exact description of the same, reference being had to the drawing annexed constituting a part of this specification.

My improvement relates to an arrangement of the stalks of cane which are to be selected from the general crop of a sugar-plantation and preserved until the proper season for planting arrives. The especial object which I have in view by the peculiar arrangement above mentioned is the perfect preservation of the cane retained for planting purposes from the destructive effects of water, heat, and cold during the interval elapsing between the time of cutting said "plant-cane" and the time of planting the same.

The method by which I accomplish the above desirable object is the result of many years' experience as a sugar-cane producer. My experiments in the preservation of cane in the manner hereinafter described have resulted in perfect success; and in view of the great importance of my invention, not only to sugar-planters but to the public in general, my invention becomes exceedingly valuable, and hence entitled to protection, that I may reap the benefit of my experiments.

The primary object which I have in view in my invention is the prevention of the evaporation of the juices from the cane-stalks, while at the same time I preserve their vitality until the period of time at which they are required to be planted. This I accomplish by placing the lower or cut end of each stalk in an upright position in direct contact with the earth bed upon which my "mat" is established. The stalks placed in this manner will to some extent absorb a degree of moisture from the earth, from the dews, from the air, together with the decomposition of the green cane-leaves, whereby moisture is created, all of which are sources of life and vitality to the cane-stalks, causing, likewise, slow vegetation and continuous life.

The second object to be accomplished in my device is the prevention of too much heat or fermentation, which may be created by the decomposition of the green leaves, as before mentioned. This difficulty is obviated in my invention by providing in the center of the mat an open air-flue, by means of which the whole mat is most effectually ventilated, and the surplus heat generated therein is allowed free exit therefrom and a proper degree of temperature at all times maintained, preventing, likewise, the cane from molding and from dry-rot.

The third object accomplished in my improvement is to preserve the cane-stalks from the withering, blighting effects of cold in winter, which is effected by placing the cane-stalks composing the "mat" in a close or compact form, and by placing likewise an embankment of earth around the exterior lower base of the "mat," whereby the cold air is prevented from penetrating the mat from below, and the warm air generated within the mat, as before described, will prevent the ingress of cold air from the upper part thereof.

The fourth and final object accomplished by my improvement is the preservation of the cane-stalks from the effects of water caused by rains; and this desirable object is attained by constructing the mat of a compact and conical form, whereby the water is made instantly to run off into the drains provided for this purpose, whence it is conveyed away from the base of the mat and beyond the power of effecting injury.

To construct my "mat" precaution must be taken first to level off the ground as smooth as possible upon which the mat is to be established, in order that the lower or cut end of every stalk may come in direct contact with the ground, as before stated. The earth should likewise be made quite loose, that the stalks thereon placed may the more readily absorb moisture therefrom, and thereby produce the results sought to be attained. From thirty to forty feet in diameter is recommended as the most desirable size for a single "mat," and proper care must be taken to have the center air-flue of a size to correspond with the size of the mat. Before placing the earth embankment around the base of the mat it will be necessary to place some loose hay, grass, or straw upon the cane to be covered, to prevent the contact of the earth with the said stalks at their sides, and likewise to assist in preventing the ingress of cold air to the "mat" at its base.

Figure 2:
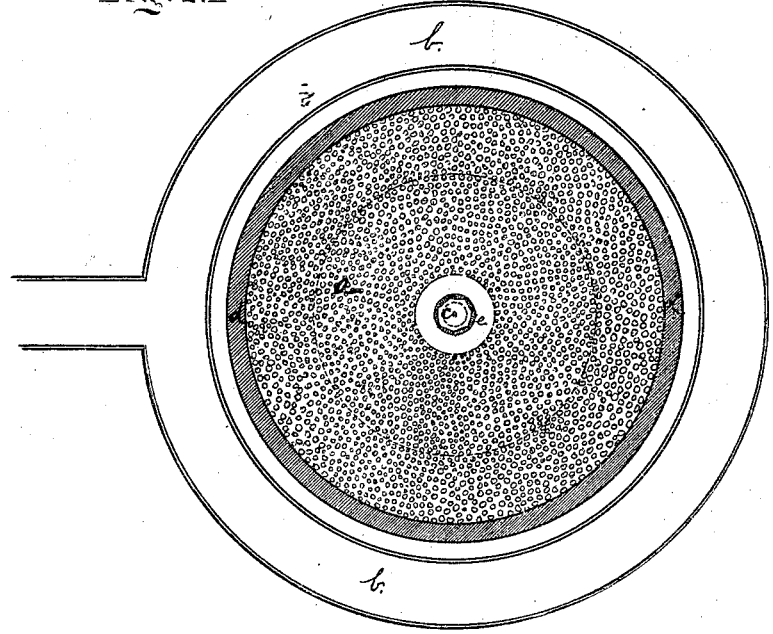

My improvement will now be thoroughly understood by reference to the drawing hereunto annexed, whereon is shown at Figure 1 a sectional view of my "mat" as constructed for the effectual preservation of the cane from the causes above described. Fig. 2 is a plan or top view of the same.

$a$ are the stalks; $b$, the drain around the exterior base of the mat; $c$, the air-flue above mentioned; $d$, the earth embankment at the base of the mat; and $e$ are upright slabs or scantling of timber forming the air-flue $c$ aforesaid.

Having described my invention, what I desire to secure by Letters Patent is the following claim:

The herein-described method of preserving "plant-cane," or of any other method the peculiar features of which are substantially the same as that which is herein described, and for the purposes set forth.

FRANÇOIS O. DARBY,
*Of Attakapas, La.*

Attest:
  JAMES H. PROFFITT,
  H. DROEGE.